(12) United States Patent
Lin et al.

(10) Patent No.: US 7,633,568 B2
(45) Date of Patent: Dec. 15, 2009

(54) PIXEL STRUCTURE

(75) Inventors: Chun-An Lin, Yunlin County (TW); Wen-Hsiung Liu, Pingtung County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 258 days.

(21) Appl. No.: 11/563,036

(22) Filed: Nov. 24, 2006

(65) Prior Publication Data
US 2008/0055501 A1 Mar. 6, 2008

(30) Foreign Application Priority Data
Sep. 6, 2006 (TW) .............................. 95132836 A

(51) Int. Cl.
*G02F 1/1343* (2006.01)
(52) U.S. Cl. ....................................................... 349/38

(58) Field of Classification Search ................... 385/38, 385/39, 139
See application file for complete search history.

(56) References Cited

U.S. PATENT DOCUMENTS 6,900,871 B1  5/2005  Song et al.
2006/0061700 A1 * 3/2006 Chung et al. .................. 349/38

FOREIGN PATENT DOCUMENTS

TW        I255940        6/2006

* cited by examiner

*Primary Examiner*—Sarah Song
(74) *Attorney, Agent, or Firm*—Jianq Chyun IP Office

(57) ABSTRACT

A pixel structure using a U-shaped storage capacitance electrode for increasing the aperture ratio thereof is provided. The pixel structure may compensate a variation of the parasitic capacitance (Cgd) between gate and drain for the shift along Y-axis of an exposure machine, so as to reduce the variation of feed-through voltage of pixels.

7 Claims, 8 Drawing Sheets

PIXEL STRUCTURE

CROSS-REFERENCE TO RELATED APPLICATION

This application claims the priority benefit of Taiwan application serial no. 95132836, filed on Sep. 6, 2006. All disclosure of the Taiwan application is incorporated herein by reference.

BACKGROUND OF THE INVENTION

1. Field of Invention

The present invention relates to a pixel structure. More particularly, the present invention relates to a pixel structure with a U-shaped storage capacitance electrode.

2. Description of Related Art

In current society, the development of multi-media technology relies much on the progress of semiconductor devices or display apparatuses. Among displays, thin film transistor liquid crystal displays (TFT-LCD) with advantages of high display quality, good space utilization rate, low power consumption, no radiation, etc. have gradually become main stream products in the market.

A common TFT-LCD is mainly formed by a TFT array substrate, a color filter substrate, and a liquid crystal layer sandwiched between the two. The TFT array substrate is formed by a plurality of pixel structures arranged in matrix. Each pixel structure is mainly formed by a TFT, a pixel electrode, and a pixel storage capacitor. The TFT includes a gate, a channel layer, a drain, and a source, and is used as a switching element of an LCD unit. When the pixel electrode is in a selected state (i.e. "ON" state), signals are written in the pixel. When the pixel electrode is in a non-selected state (i.e. "OFF" state), the pixel storage capacitor is used to keep the level to drive the liquid crystal.

FIG. 1 is a schematic top view of a conventional pixel structure. Referring to FIG. 1, the conventional pixel structure 100 mainly includes a scan line 110, a data line 120, a storage capacitance electrode 130, a TFT 140, a passivation layer (not shown), and a pixel electrode 150. The scan line 110 and the data line 120 are disposed on a substrate (not shown). The H-type storage capacitance electrode 130 is disposed on the substrate. Further, the storage capacitance electrode 130 includes two branches 130a, 130b and a central portion 130c connected therebetween. The TFT 140 is disposed on the substrate and is driven by the scan line 110 and the data line 120. The passivation layer covers the scan line 110, the data line 120, the storage capacitance electrode 130, and the TFT 140. The pixel electrode 150 is electrically connected to the TFT 140 via the contact hole CH in the passivation layer.

In the pixel structure 100, the storage capacitance electrode 130 presents an H-type structure distribution, in which the central portion 130c spans across in the center of an aperture portion of the pixel structure 100, so the aperture ratio of the pixel can be reduced. Moreover, when a rubbing process is performed on an alignment film, a poor alignment may be incurred due to the existence of the central portion 130c, resulting in the problem of light leakage generated in the center of the aperture portion of the pixel, thus further leading to a low contrast of a panel.

With the storage capacitance design remains unchanged, if it is intended to increase the aperture ratio of the pixel, referring to FIG. 2, the width of the central portion 130c may be reduced, and the widths of the branches 130a, 130b may be increased, so as to maintain the same storage capacitance. FIG. 3A is a schematic view of the relative position between the storage capacitance electrode and a black matrix after the TFT array substrate with the pixel structure of FIG. 1 and the color filter substrate are assembled. FIG. 3B is a schematic view of the relative position between the storage capacitance electrode and the black matrix after the assembly of the TFT array substrate with the pixel structure of FIG. 1 and the color filter substrate shifts. In order to simplify the drawing, in FIGS. 3A and 3B, only the inner edges B1 and B2 of the black matrix are shown, and the elements on the color filter substrate are not shown. Referring to FIGS. 3A and 3B, in the design of the black matrix, in order to avoid the side light leakage, it is necessary to keep the distance between the outer edge of the storage capacitance electrode 130 and the inner edge B1 of the black matrix to be p, and to keep the distance between the inner edge of the storage capacitance electrode 130 and the inner edge B1 of the black matrix to be r. In this manner, when the assembly of the TFT array substrate and the color filter substrate shifts along X-axis, the aperture ratio of the pixel is not affected.

FIG. 4A is a schematic view of the relative relation between the storage capacitance electrode and the black matrix after the TFT array substrate with the pixel structure of FIG. 2 and the color filter substrate are assembled. FIG. 4B is a schematic view of the relative relation between the storage capacitance electrode and the black matrix after the assembly of the TFT array substrate with the pixel structure of FIG. 2 and the color filter substrate shifts. In order to simplify the drawing, in FIGS. 4A and 4B, only the inner edges B1 and B2 of the black matrix are shown, and the elements on the color filter substrate are not shown. Referring to FIGS. 4A and 4B, when the assembly of the TFT array substrate and the color filter substrate shifts along X-axis, and if the shift is larger than r, the aperture ratio of the pixel is affected, resulting in an unstable aperture ratio.

FIG. 5A is a schematic view of the relative position of the gate, the source, and the drain under the circumstance that the exposure machine does not shift during the lithography process of forming the source and the drain. FIG. 5B is a schematic view of the relative position of the gate, the source, and the drain under the circumstance that the exposure machine shifts during the lithography process of forming the source and the drain. Compared with the source S and the drain D as shown in FIG. 5A, the source S and the drain D as shown in FIG. 5B shift downwards obviously. In this manner, the overlap area between the drain and the gate increases (i.e. a black block as shown in FIG. 5B), i.e. the value of the parasitic capacitance Cgd between the gate and the drain increases, which leads to the increase of the feed-through voltage of pixel used to drive the liquid crystal molecules and negatively influences the display quality.

SUMMARY OF THE INVENTION

Accordingly, the present invention is directed to provide a pixel structure. The pixel structure uses a U-shaped first storage capacitance electrode to increase the aperture ratio of pixel. The pixel structure can compensate a variation of the parasitic capacitance Cgd between the gate and the drain resulting from the shift along Y-axis of an exposure machine, so as to reduce the variation of the feed-through voltage of pixel.

In order to achieve the above or other objectives, the present invention provides a pixel structure. The pixel structure is disposed on a substrate and comprises a scan line, a data line, a first storage capacitance electrode, a TFT, a second storage capacitance electrode, and a pixel electrode. The scan line and the data line are crossed with each other on the substrate. The first storage capacitance electrode is disposed on the substrate and comprises a first portion, a second portion and a third portion. The first portion is substantially parallel and adjacent to the data line, and has a first end adjacent to the scan line. The second portion is substantially parallel and adjacent to the next data line and has a second end near the scan line. The third portion is substantially parallel and adjacent to the scan line and is connected between the first end and the second end. The TFT is disposed on the substrate, and is driven by the scan line and the data line, wherein the TFT comprises a gate, a channel layer, a source, and a drain. The second storage capacitance electrode is disposed above the third portion, covers a part of the third portion, and is electrically connected to the drain. The pixel electrode is electrically connected to the TFT.

In an embodiment of the present invention, the first portion, the second portion, and the third portion of the first storage capacitance electrode form a U-shaped structure.

In an embodiment of the present invention, the gate is electrically connected to the scan line, the source is electrically connected to the data line, and the drain is electrically connected to the pixel electrode.

In an embodiment of the present invention, the drain and the second storage capacitance electrode are formed by the same film layer.

In an embodiment of the present invention, the drain further comprises a drain connection portion, and the second storage capacitance electrode is connected to the drain via the drain connection portion.

In an embodiment of the present invention, the second storage capacitance electrode is substantially parallel to the third portion of the first storage capacitance electrode.

In an embodiment of the present invention, the second storage capacitance electrode partially protrudes from the third portion of the first storage capacitance electrode.

In an embodiment of the present invention, the pixel structure further comprises a passivation layer. The passivation layer covers the scan line, the data line, the first storage capacitance electrode, the TFT, and the second storage capacitance electrode, wherein the pixel electrode is electrically connected to the drain via a contact hole of the passivation layer.

The pixel structure of the present invention adopts the U-shaped storage capacitance electrode, thus facilitating increasing the aperture ratio of the pixel and increasing the illuminance of a display panel. Moreover, compared with the H-type storage capacitance electrode adopted in the conventional pixel structure, the central portion of the pixel does not have the storage capacitance electrode, so the problem of poor alignment caused by the storage capacitance electrode spanning across the central portion of the pixel in the conventional art can be avoided, thereby improving the contrast of the panel.

Further, the pixel structure of the present invention can use the overlap area between the first storage capacitance electrode and the second storage capacitance electrode to increase the storage capacitance. Different from the conventional pixel structure, the pixel structure of the present invention can achieve the same storage capacitance without reducing the width of the central portion of the H-type storage capacitance electrode and increasing the widths of the branches. Thus, the distance between the inner edge and outer edge of the first storage capacitance electrode and the inner edge of the black matrix can be kept, so as to maintain a stable aperture ratio. Further, in the process of forming the source and the drain of the TFT, if the exposure machine shifts along Y-axis, since the overlap area between the first storage capacitance electrode and the second storage capacitance electrode may increase accordingly, the storage capacitance also increases, so as to compensate the increase of the feed-through voltage of pixel caused by the increase of the parasitic capacitance Cgd between the gate and the drain resulting from the shift along Y-axis of the exposure machine.

In order to the make aforementioned and other objects, features and advantages of the present invention comprehensible, preferred embodiments accompanied with figures are described in detail below.

DESCRIPTION OF EMBODIMENTS

The First Embodiment

Figure 6:
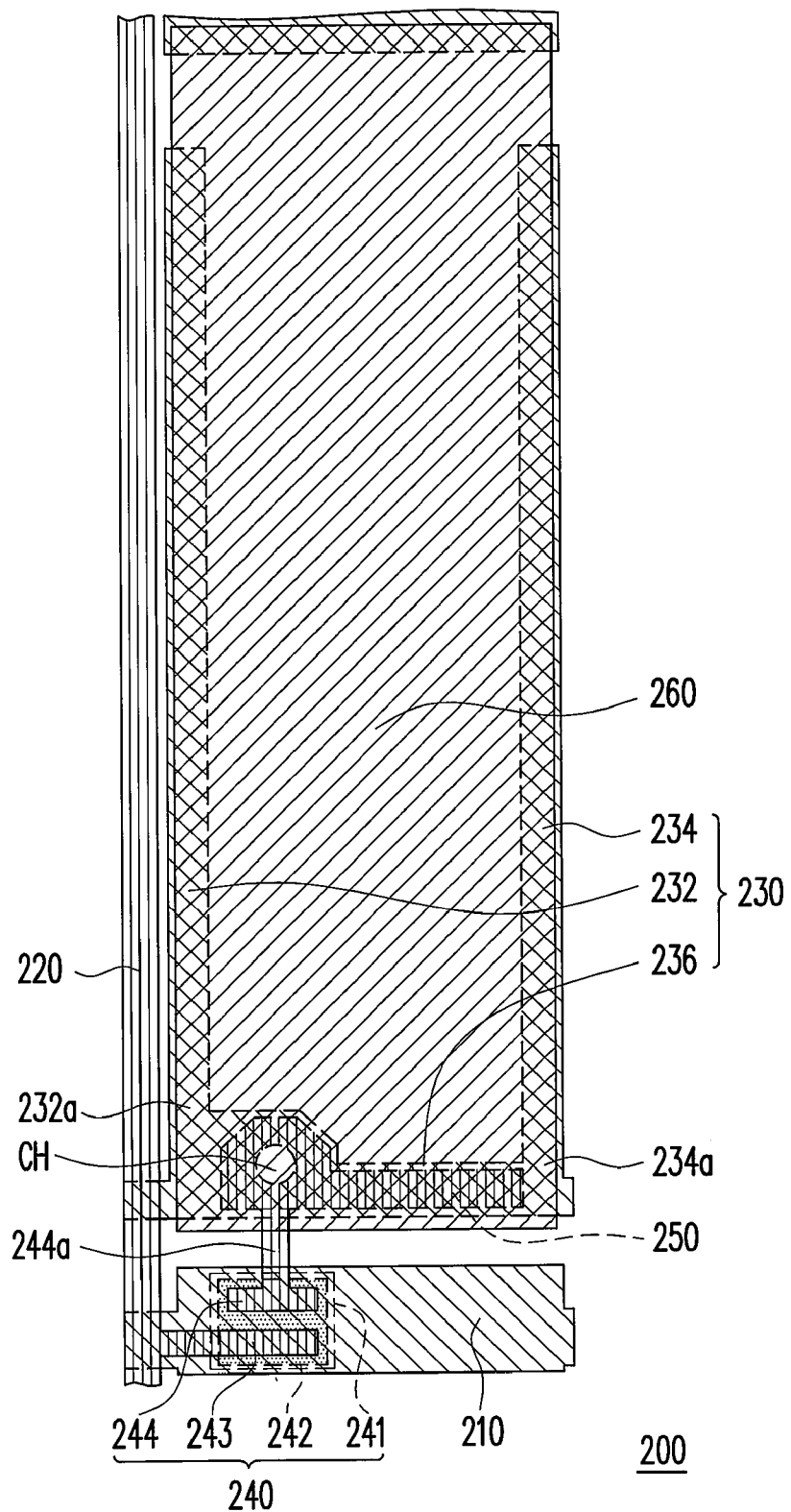
FIG. 6 is a schematic top view of a pixel structure according to the first embodiment of the present invention.

FIG. 6 is a schematic top view of a pixel structure according to the first embodiment of the present invention. Referring to FIG. 6, the pixel structure 200 is disposed on a substrate (not shown), and mainly includes a scan line 210, a data line 200, a first storage capacitance electrode 230, a TFT 240, a second storage capacitance electrode 250, a passivation layer (not shown), and a pixel electrode 260. The structure of each element and the connection relation between the elements are illustrated accompanied with the drawing below.

The scan line 210 and the data line 220 are crossed with each other on the substrate. In this embodiment, the first storage capacitance electrode 230 is designed to be a U-shaped structure to improve the aperture ratio of the pixel. The U-shaped first storage capacitance electrode 230 includes a first portion 232, a second portion 234, and a third portion 236. The first portion 232 at the left in the figure is substantially parallel and adjacent to the data line 220. Moreover, the first portion 232 has a first end 232a adjacent to the scan line 210. The second portion 234 at the right in the figure is substantially parallel and adjacent to the next data line (not shown). Moreover, the second portion 234 has the second end 234a near the scan line 210. The third portion 236 is substantially parallel and adjacent to near the scan line 210. Further, the third portion 236 is connected between the first end 232a of the first portion 232 and the second end 234a of the second portion 234, and the first portion 232, the second portion 234, and the third portion 236 thus form a U-shaped structure. Compared with the H-type storage capacitance electrode adopted in the conventional pixel structure, the design of U-shaped first storage capacitance electrode 230 is beneficial for improving the aperture ratio of the pixel. Since the third portion 236 is disposed adjacent to the scan line 210, the problem of poor alignment of the aperture will not occur during the rubbing process.

The TFT 240 is disposed on the substrate, and is driven by the scan line 210 and the data line 220. The TFT 240 mainly includes a gate 241, a channel layer 242, a source 243, and a drain 244. The position of the scan line 210 corresponding to the channel layer 242 is used as the gate 241. The channel layer 242 is disposed above the gate 241. The source 243 and the drain 244 are disposed on the channel layer 242, and the source 243 is electrically connected to the data line 220.

In this embodiment, the drain 244 protrudes from the third portion 236 of the first storage capacitance electrode 230 at one side to form a drain connection portion 244a, and thus the second storage capacitance electrode 250 can be electrically connected to the drain 244 via the drain connection portion 244a. During the fabricating of the pixel structure 200, the drain 244, the drain connection portion 244a, and the second storage capacitance electrode 250 are formed by the same film layer. It can be seen from FIG. 6 that the second storage capacitance electrode 250 is disposed above the third portion 236 of the first storage capacitance electrode 230, covers a part of the third portion 236, and is substantially parallel to the third portion 236. In this manner, the overlap area between the third portion 236 of the first storage capacitance electrode 230 and the second storage capacitance electrode 250 can increase the storage capacitance.

The passivation layer (not shown) covers the scan line 210, the data line 220, the first storage capacitance electrode 230, the TFT 240, and the second storage capacitance electrode 250. The pixel electrode 260 is electrically connected to the drain 244 of the TFT 240 via the contact hole CH in the passivation layer.

Figure 1:
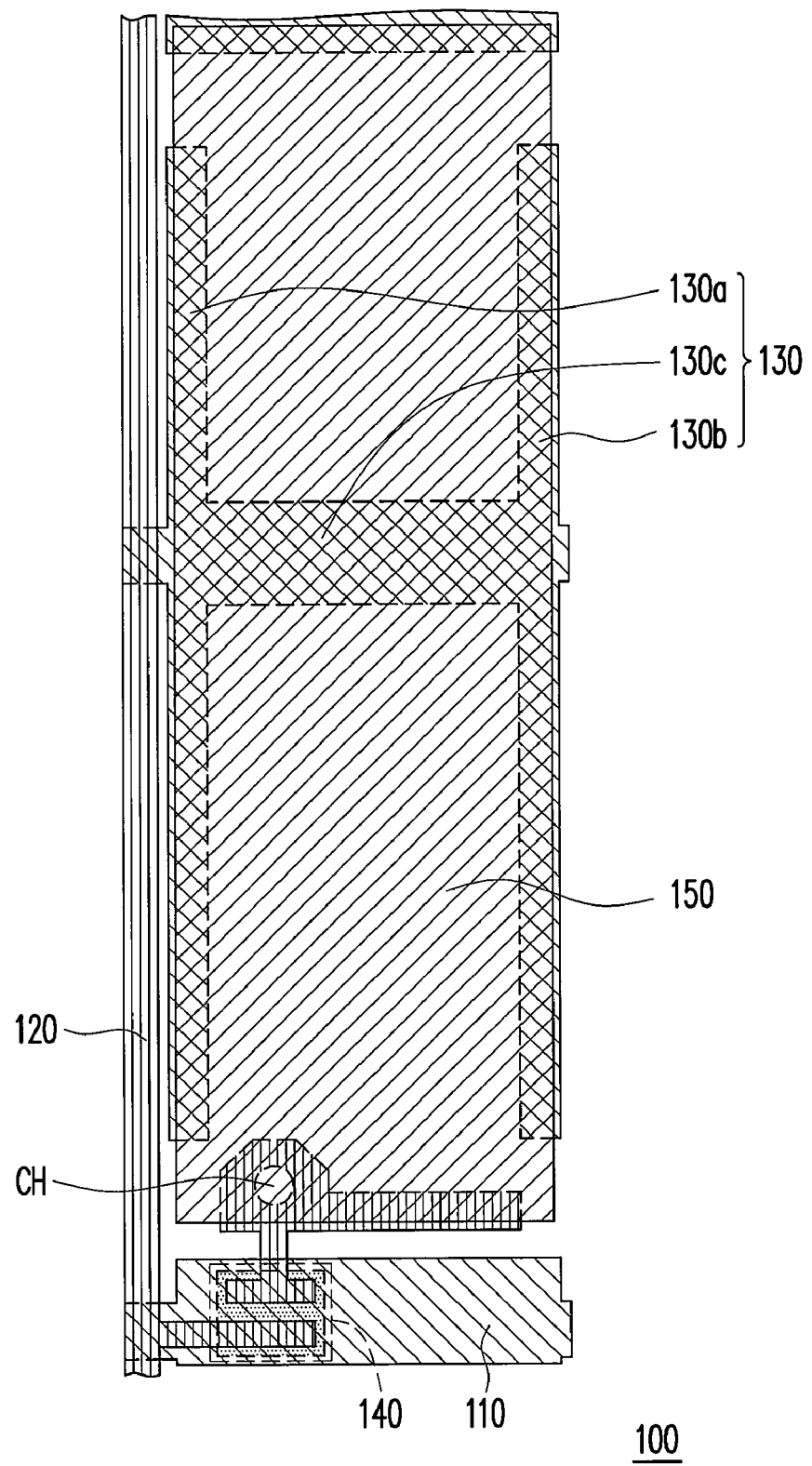
FIG. 1 is a schematic top view of a conventional pixel structure.
Figure 2:
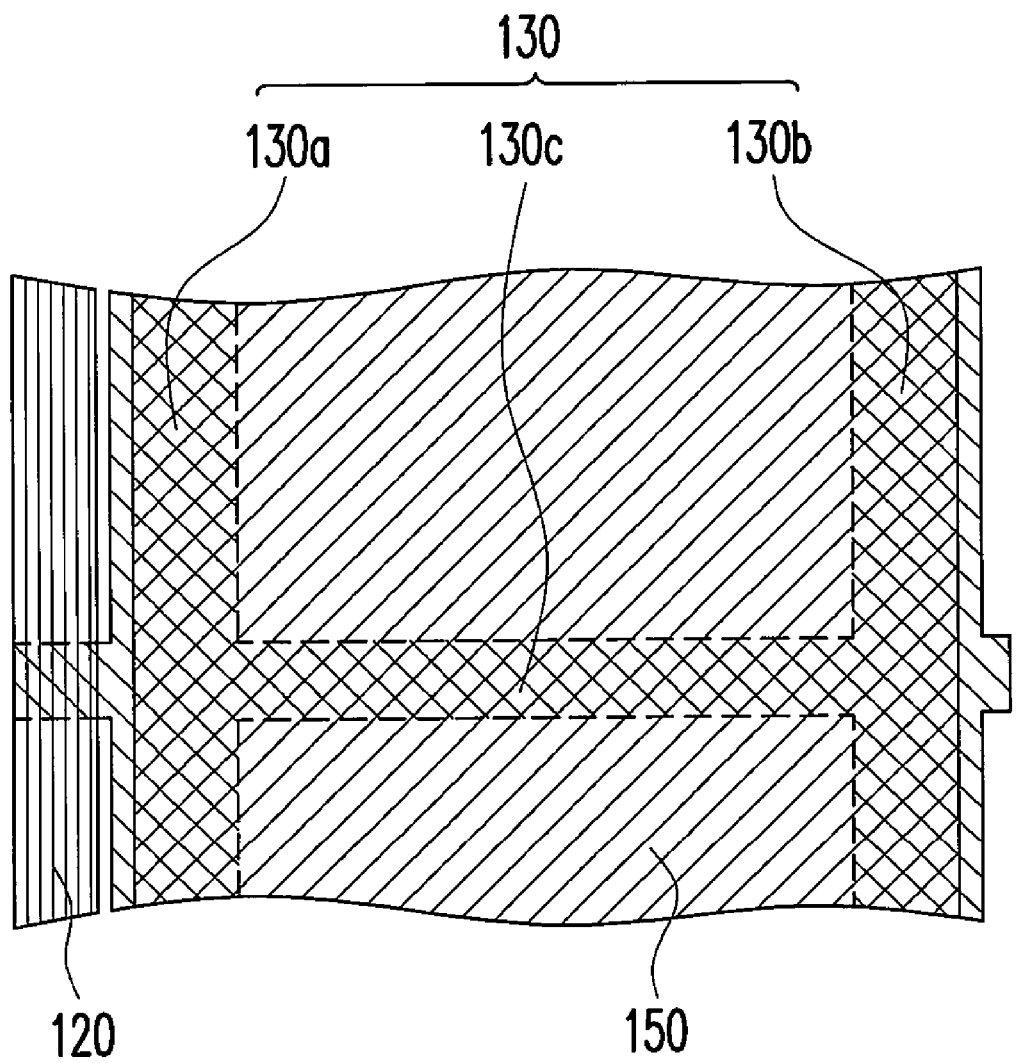
FIG. 2 is a partial schematic top view of the second storage capacitance electrode of the pixel structure as shown in FIG. 1 having the width of the central portion reduced and the widths of the two branches increased.
Figure 3A:
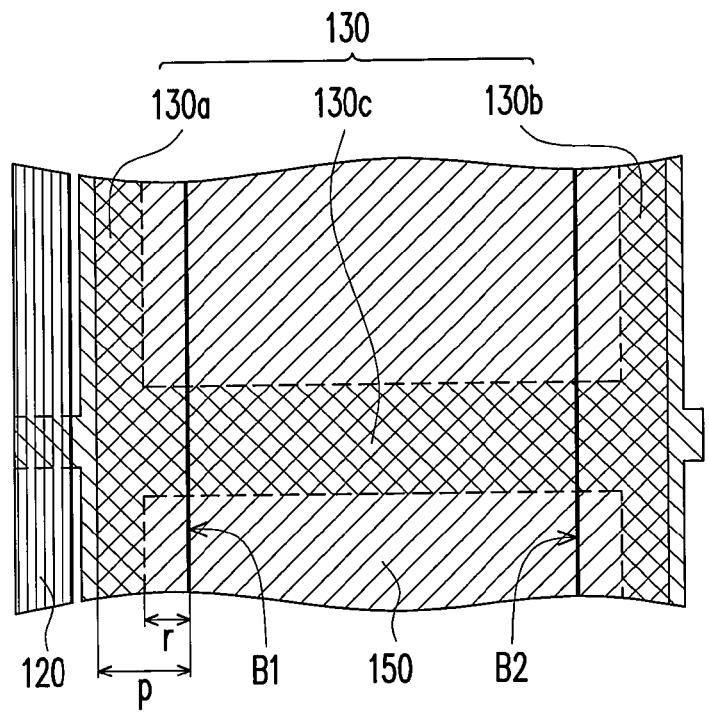
FIG. 3A is a schematic view of the relative relation between the storage capacitance electrode and the black matrix after the TFT array substrate with the pixel structure of FIG. 1 and the color filter substrate are assembled.
Figure 3B:
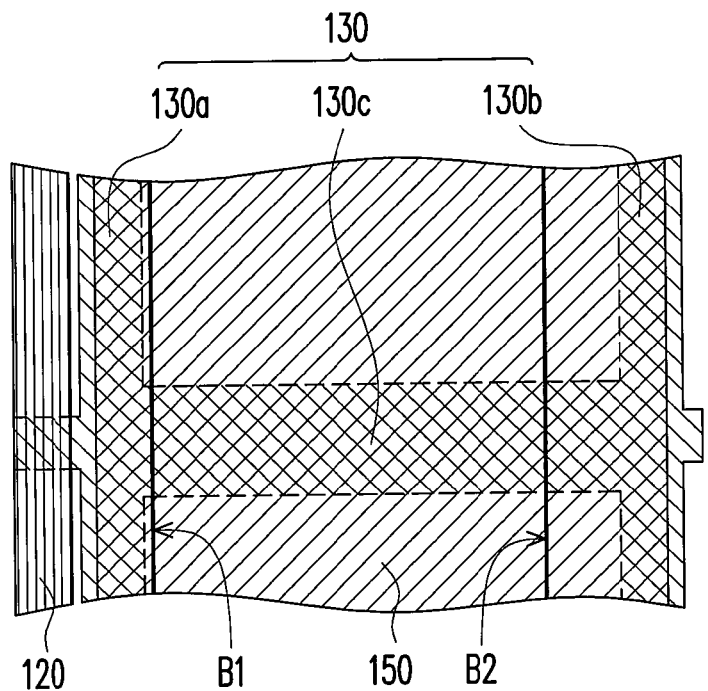
FIG. 3B is a schematic view of the relative relation between the storage capacitance electrode and the black matrix after the assembly of the TFT array substrate with the pixel structure of FIG. 1 and the color filter substrate shifts.
Figure 4A:
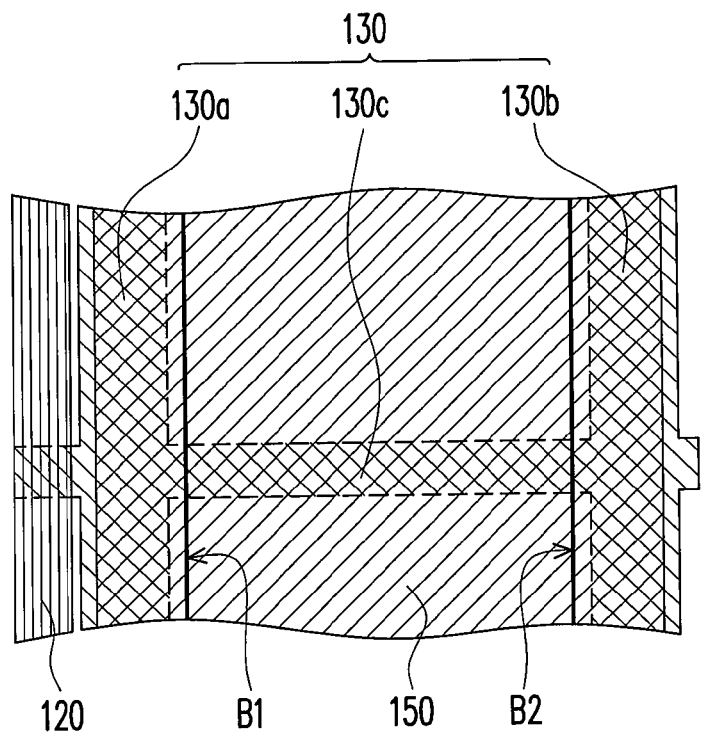
FIG. 4A is a schematic view of the relative relation between the storage capacitance electrode and the black matrix after the TFT array substrate with the pixel structure of FIG. 2 and the color filter substrate are assembled.
Figure 4B:
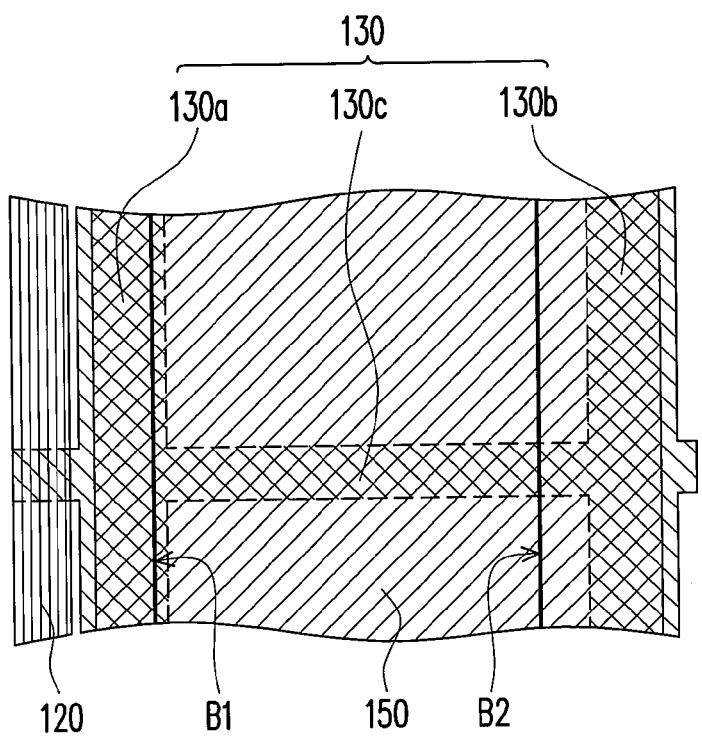
FIG. 4B is a schematic view of the relative relation between the storage capacitance electrode and the black matrix after the assembly of the TFT array substrate with the pixel structure of FIG. 2 and the color filter substrate shifts.
Figure 5A:
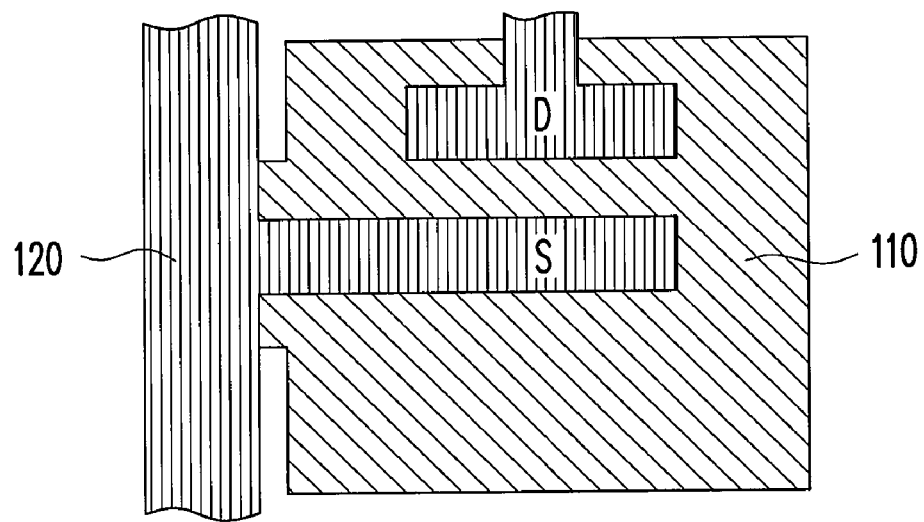
FIG. 5A is a schematic view of the relative position of the gate, the source, and the drain, under the circumstance that the exposure machine does not shift during the process of forming the source and the drain by using a lithography process.
Figure 5B:
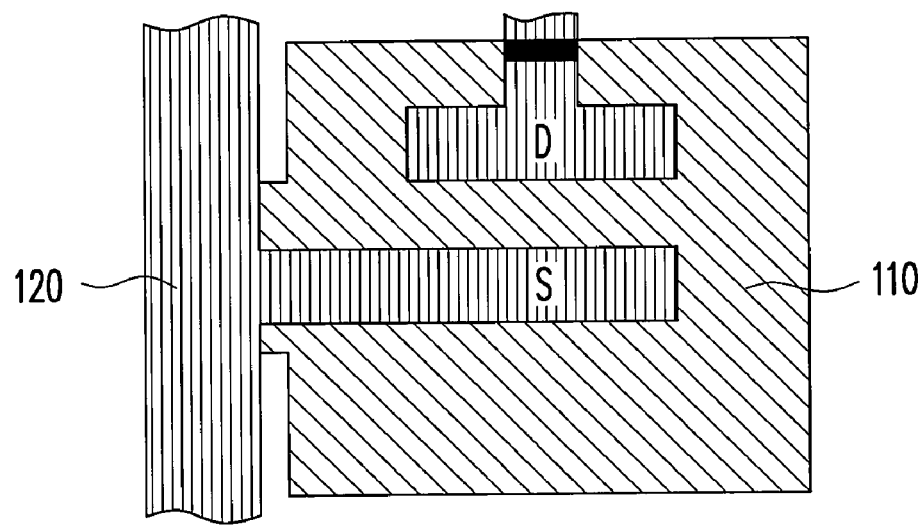
FIG. 5B is a schematic view of the relative position of the gate, the source, and the drain under the circumstance that the exposure machine shifts during the process of forming the source and the drain by using the lithography process.

In the pixel structure 200, the overlap area between the first storage capacitance electrode 230 and the second storage capacitance electrode 250 can be used to increase the storage capacitance without reducing the width of the central portion and increasing the widths of the two branches of the pixel structure as shown in FIG. 2, so as to maintain the same storage capacitance. Therefore, the distance between the inner edge and outer edge of the first storage capacitance electrode 230 and the inner edge of the black matrix (not shown) is kept, so as to maintain the stable aperture ratio.

The Second Embodiment

Figure 7:
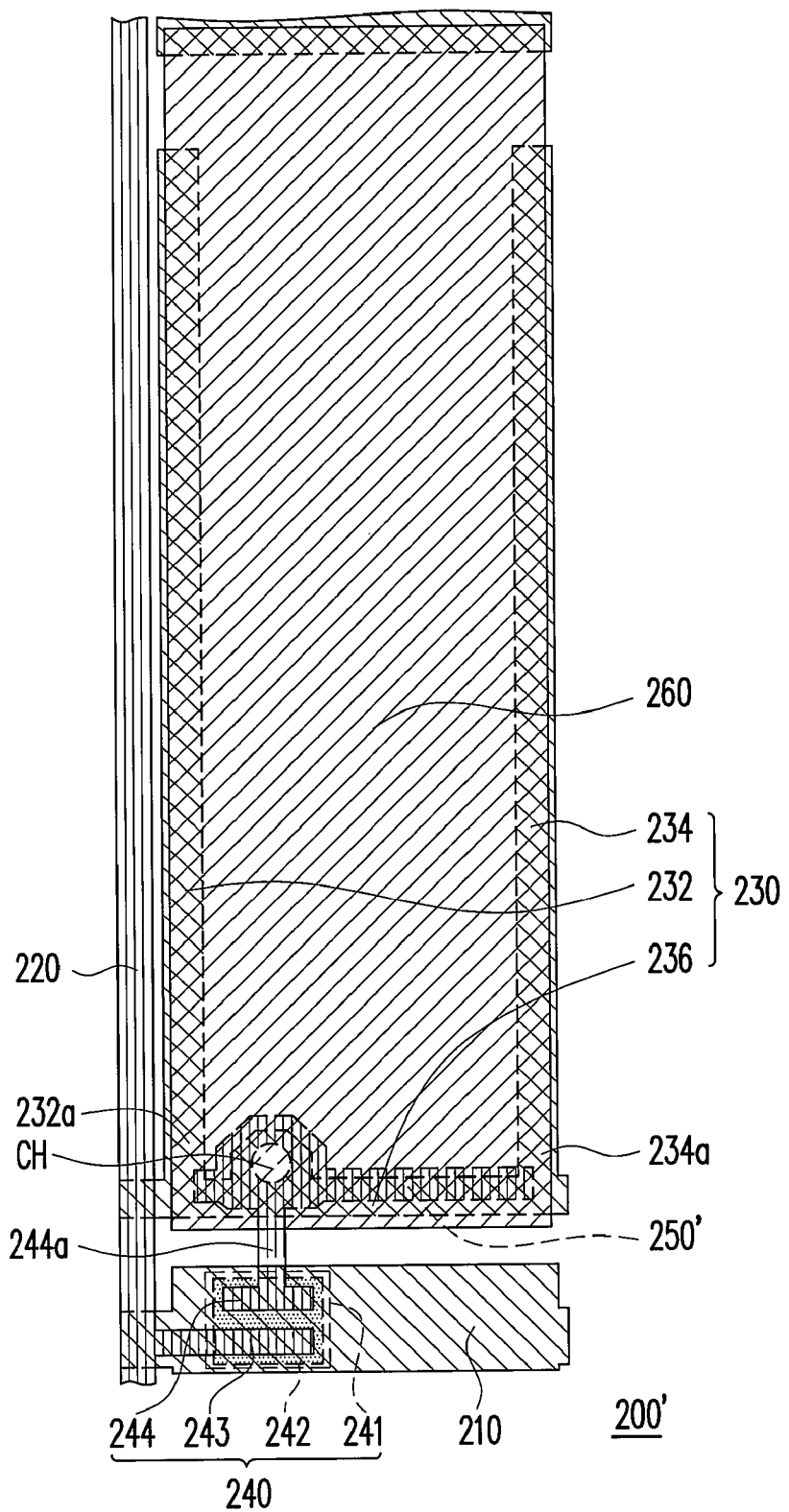
FIG. 7 is a schematic top view of a pixel structure according to the second embodiment of the present invention.

FIG. 7 is a schematic top view of a pixel structure according to the second embodiment of the present invention. Referring to FIG. 7, the pixel structure 200' is substantially the same as the pixel structure 200 as shown in FIG. 6, and only the difference is described herein. The second storage capacitance electrode 250' as shown in FIG. 7 partially protrudes from the third portion 236 of the first storage capacitance electrode 230.

Figure 8A:
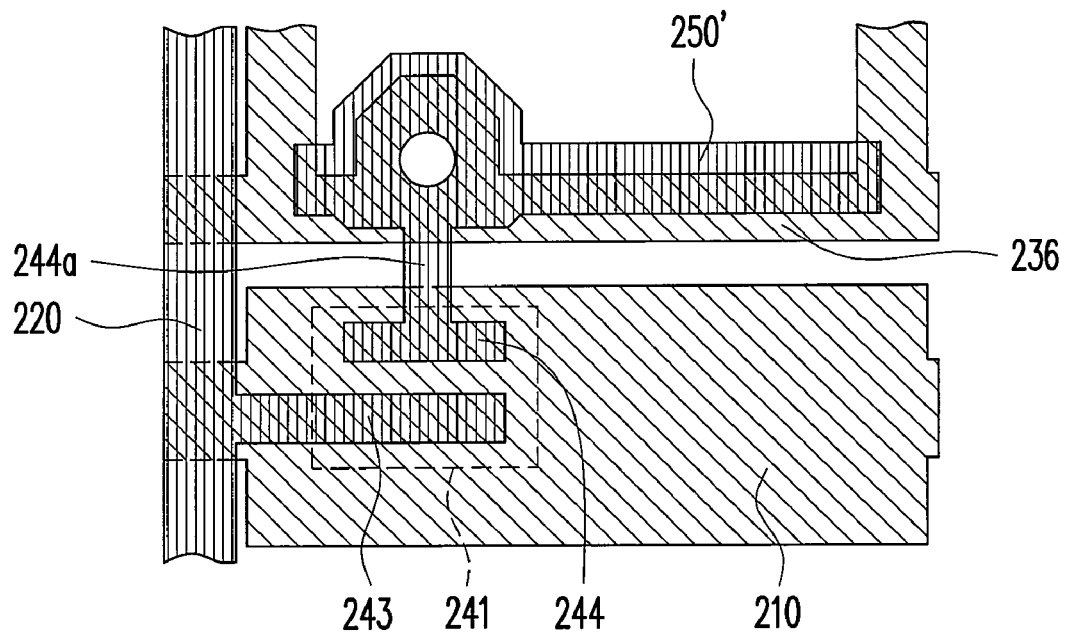
FIG. 8A is a schematic view of the relative position of the gate, the source, and the drain under the circumstance that the exposure machine does not shift during the process of forming the source and the drain as shown in FIG. 7 by using the lithography process.
Figure 8B:
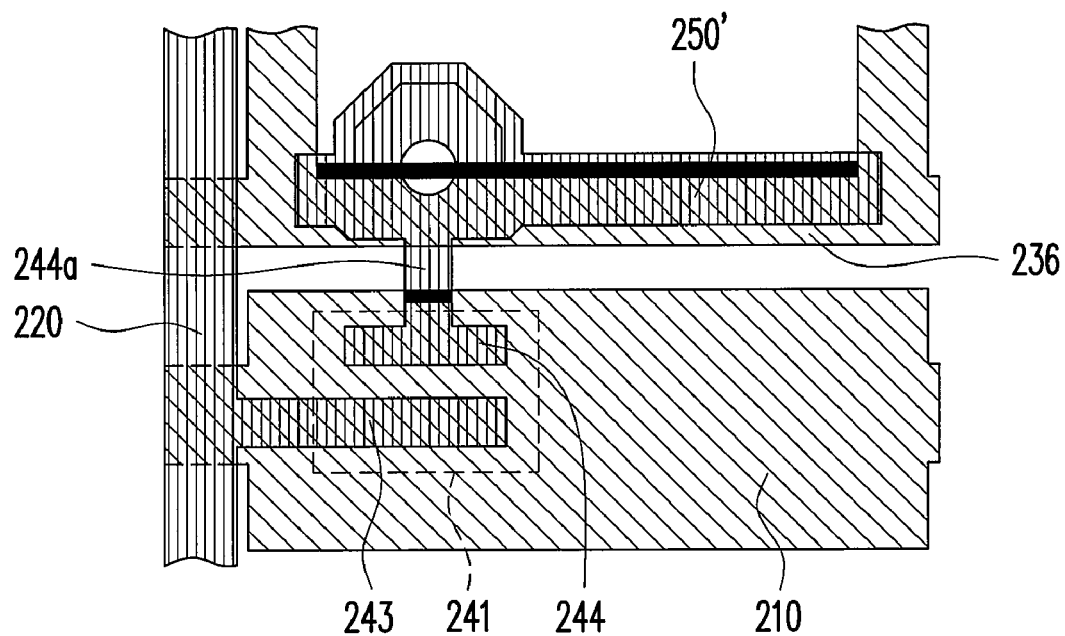
FIG. 8B is a schematic view of the relative position of the gate, the source, and the drain under the circumstance that the exposure machine shifts during the process of forming the source and the drain as shown in FIG. 7 by using the lithography process.

FIG. 8A is a schematic view of the relative position of the gate, the source, and the drain under the circumstance that the exposure machine does not shift during the lithography process of forming the source and the drain as shown in FIG. 7. FIG. 8B is a schematic view of the relative position of the gate, the source, and the drain under the circumstance that the exposure machine shifts along the Y-axis during the lithography process of forming the source and the drain as shown in FIG. 7. Compared with the source and the drain as shown in FIG. 8A, the source and the drain as shown in FIG. 8B shifts downwards obviously. In this manner, the overlap area between the drain and the gate increases, i.e. the value of the parasitic capacitance Cgd between the drain and the gate increases. However, it can be seen from FIG. 8B that when the shifting along the Y-axis, the overlap area between the third portion 236 of the first storage capacitance electrode 230 and the second storage capacitance electrode 250' increases accordingly, and the storage capacitance also increases, so as to compensate the increase of the feed-through voltage of the pixel caused by the parasitic capacitance Cgd between the gate and the drain resulting from the shift along Y-axis of the exposure machine.

In summary, the pixel structure of the present invention has at least the following advantages.

(1) Compared with the H-type storage capacitance electrode adopted in the conventional pixel structure, the pixel structure of the present invention adopts the U-shaped first storage capacitance electrode, so as to facilitate increasing the aperture ratio of the pixel.

(2) Since the first storage capacitance electrode is a U-shaped structure, the storage capacitance electrode does not exist in the center of the pixel region, and the problem of poor alignment is avoided during the rubbing process, thereby improving the contrast of the display panel.

(3) In the pixel structure provided by the present invention, the overlap area between the first storage capacitance electrode and the second storage capacitance electrode is used to increase the storage capacitance. Therefore, different from the conventional pixel structure, the pixel structure of the present invention can achieve the same storage capacitance without reducing the width of the central portion of the H-type storage capacitance electrode and increasing the widths of the branches. Thus, the distance between the inner edge and outer edge of the first storage capacitance electrode and the inner edge of the black matrix is kept, so as to maintain the stable aperture ratio.

(4) In the lithography process of forming the source and the drain in the pixel structure of the present invention, if the exposure machine shifts along Y-axis, since the overlap area between the first storage capacitance electrode and the second storage capacitance electrode may increase accordingly, the storage capacitance also increases. In this manner, the pixel structure of the present invention can compensate the increase of the feed-through voltage of the pixel caused by the parasitic capacitance Cgd between the gate and the drain resulting from the shift along Y-axis of the exposure machine.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. A pixel structure, comprising:
   a scan line and a data line crossed with each other on a substrate;
   a first storage capacitance electrode disposed on the substrate, comprising:
      a first portion being substantially parallel and adjacent to the data line and having a first end adjacent to the scan line;
      a second portion being substantially parallel and adjacent to the next data line and having a second end adjacent to the scan line;
      a third portion being substantially parallel and adjacent to the scan line and connected between the first end and the second end;
   a thin film transistor (TFT) disposed on the substrate and driven by the scan line and the data line, wherein the TFT comprises a gate, a channel layer, a source and a drain;
   a second storage capacitance electrode disposed above the third portion, covering a part of the third portion, and being electrically connected to the drain, wherein the second storage capacitance electrode partially protrudes outward from a side of the third portion of the first storage capacitance electrode and the side is away from the scan line so that the protruding portion of the second storage capacitance electrode is not overlapped with the first storage capacitance electrode; and
   a pixel electrode electrically connected to the TFT.

2. The pixel structure as claimed in claim 1, wherein the first portion, the second portion, and the third portion of the first storage capacitance electrode form a U-shaped structure.

3. The pixel structure as claimed in claim 1, wherein the gate is electrically connected to the scan line, the source is electrically connected to the data line, and the drain is electrically connected to the pixel electrode.

4. The pixel structure as claimed in claim 1, wherein the drain and the second storage capacitance electrode are formed by the same film layer.

5. The pixel structure as claimed in claim 1, wherein the drain further comprises a drain connection portion, and the second storage capacitance electrode is connected to the drain via the drain connection portion.

6. The pixel structure as claimed in claim 1, wherein the second storage capacitance electrode is substantially parallel to the third portion of the first storage capacitance electrode.

7. The pixel structure as claimed in claim 1, further comprising a passivation layer covering the scan line, the data line, the first storage capacitance electrode, the TFT, and the second storage capacitance electrode, wherein the pixel electrode is electrically connected to the drain via a contact hole of the passivation layer.

* * * * *